E. R. PARKER.
ANTISKIDDING DEVICE.
APPLICATION FILED APR. 8, 1916.

1,265,950.

Patented May 14, 1918.

Witnesses:

Inventor:
E. R. Parker
by
his Attorneys

UNITED STATES PATENT OFFICE.

ELIJAH R. PARKER, OF RIFLE, COLORADO.

ANTISKIDDING DEVICE.

1,265,950.  Specification of Letters Patent.  Patented May 14, 1918.

Application filed April 8, 1916. Serial No. 89,866.

*To all whom it may concern:*

Be it known that I, ELIJAH R. PARKER, a citizen of the United States of America, residing at Rifle, in the county of Garfield and State of Colorado, have invented certain new and useful Improvements in Antiskidding Devices, of which the following is a specification, reference being had therein to the accompanying drawing.

This invention relates to an anti-skidding device which is constructed so as to be mounted upon a tire and rim in such a manner as to prevent the wheel from skidding or slipping when in operation.

Another object of this invention is the production of an anti-skidding device, which is constructed so as to be firmly clamped upon a tire and rim in such a manner as to be positively held against accidental displacement, thus preventing the wheel from skidding or slipping upon slippery or uneven surfaces.

Another object of this invention is the production of an anti-skidding device which has a latch lever formed so as to cause the latch to be swung as the latch lever is swung in one direction, thus binding the anti-skidding device upon the tire and rim of a wheel, after which action the lever loop may be swung into position for retaining the latch lever in a set position.

With these and other objects in view this invention consists of certain novel combinations, constructions, and arrangements of parts as will be hereinafter fully described and claimed.

Referring to the accompanying drawings by numerals it will be seen that the anti-skidding device is adapted to be passed around the rim 1 and tire 2 being mounted thereon detachably as will be hereinafter specifically set forth.

Figure 2:
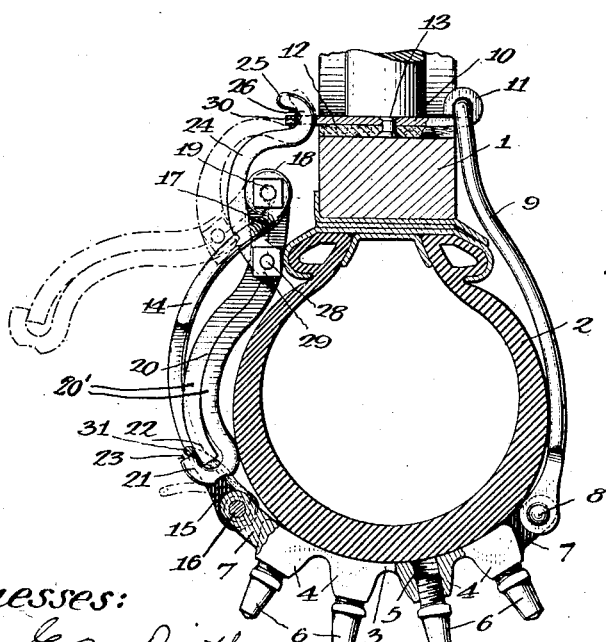
Fig. 2 is an elevation of the anti-skidding device, partly in section, taken at right angles to the structure as shown in Fig. 1, and showing the same mounted upon a fragment of a wheel.

The tread plate 3 has ribs 4 formed upon its outer surface and from these ribs extend a number of threaded openings 5 in which the studs 6 are screwed. Thus, it will be seen that the studs will be held firmly upon the tread plate and that as many of these plates may be positioned upon the tire 2 as desired. From each end of the tread plate 3 there extends an enlarged lug 7 as shown in Fig. 2. One of the lugs 7 has the pivot pin 8 extending therethrough so as to carry the U-shaped loop 9. This loop is formed from a single strand of material so as to have its end portions pivotally mounted upon the pin 8 thereby permitting this loop to be swung upon the pin outwardly away from the rim and tire or toward the rim and tire. The rim plate 10 has a sleeve 11 rolled upon one end so as to engage the loop 9 at its upper portion and between the sides thereof, thereby pivotally mounting the plate upon this loop 9. It is, of course, obvious that if so desired the rim plate 10 may be provided with a strip of felt, leather, or other material 12 which may be held in position by means of the rivet 13, thereby permitting this strip to fit upon the rim 1 and thus prevent the anti-skidding device from marring the beauty of the wheel. The curved arms 14 have their ends 15 flattened so as to fit upon the pivot pin 16 carried by the remaining lug 7. These arms 14 have their remaining ends bent inwardly as shown at 17 to form eyes 18 which carry the bolt and nut 19. Thus, it will be seen that these arms 14 will be held in substantial alinement with each other so as to swing as a unit when the device is in operation. The latch lever 20 comprises a pair of arms 20' which fit upon each other throughout practically their entire length, although one arm terminates in a hook portion 21 fitting around the end 22 of the remaining arm 20', thus holding the latch lever 20 in an assembled condition. It is obvious also that by having the hook portion 21 extending around the end 22 the end of the hook forms a shoulder 23, while a portion of the end 22 forms an abutment. This latch lever 20 is pivotally mounted upon the bolt 19 carried by the eyes 18.

Figure 1:
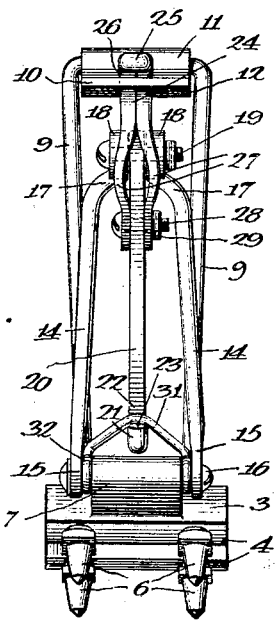
Figure 1 is a side elevation of the anti-skidding device.

The latch 24 is also formed of a single strip of material bent intermediate its ends as at 25 so as to form the hook catch 26. Although this latch being bent intermediate its ends fits upon itself for quite a distance as shown in Fig. 1 it is spread apart at its inner lower end, as shown at 27, so as to embrace the side portions of the latch lever 20 so that when the bolt 28 having the nut 29 is passed through the latch it will be pivotally supported upon the latch lever 20.

When this anti-skidding device is in operation it may be positioned upon the tire 1 by positioning the tread plate 3 transversely across the tire as shown. The link 9 may then be swung upon the side portion of the tire, and as this link is curved so as to conform somewhat to the contour of the tire and rim it will extend adjacent thereto. The rim plate 11 is then swung on to the rim 1. The arms 14 may then be swung inwardly while the latch lever 20 is swung outwardly from the tire 2 toward the position indicated in dotted lines in Fig. 2. This action of the latch lever will cause the latch 24 to be swung outwardly at its pivotally secured end, thus permitting its hook catch 26 to be swung toward the rim. When the hook catch 26 moves into alinement with the opening 30 formed in the rim plate 10 the latch lever 20 may be swung downwardly. The latch 24 is curved almost semi-circular so that when the lever 20 is swung so as to fit upon the tire the latch 24 will fit around the ends of the arms 14 mounted upon the bolt 19 and one end of the latch lever 20. When the latch lever has been swung down to a point adjacent the tread plate 3 the lever loop 31 may then be swung so as to engage the latch lever 20 by fitting upon the shoulder 23. This lever loop 31 is formed of a single strand of wire having eyes 32 formed at its ends, which eyes are pivotally mounted upon the pivot pin 16 upon which the arms 14 are pivotally mounted. As long as this loop 31 engages the latch lever 20 by fitting upon the shoulder 23 it will be impossible for the latch 24 to disengage the plate 10, and as a consequence the anti-skidding device will be positively held upon the rim and tire of the wheel. It is, of course, obvious that as many of these anti-skidding devices may be employed upon the wheel as desired and since the ribs extend in the same direction as the circumference of the wheel the wheel will be positively held from skidding, while the studs will further constitute an anti-slipping device for the wheel. When it is desired to remove the anti-skidding device the loop 31 is swung away from the shoulder 23 so as to permit the latch lever 20 to be swung outwardly. As this latch lever is swung outwardly it will lift the pivotally secured end of the latch, thus swinging the hook catch from engagement with the plate 10.

When the device is positioned upon a wheel as shown in Fig. 2 the tire 2 will be bearing upon one end of the latch lever 20 thereby urging the latch lever outwardly. The lever loop 31 will at this time be engaging the shoulder 23 of the hook portion 21. It will be seen that the end 22 by extending into the hook portion 21 will not only cause the latch lever 20 to be held in an assembled condition but will also constitute an abutment for limiting the movement of said lever loop in one direction when it is engaging the shoulder 23. It will be impossible for the lever loop to accidentally disengage the shoulder since sufficient space is not provided for the outward swinging of the loop because the latch lever is being urged slightly outwardly by the pressure of the tire thereon. When it is desired to move the loop from engagement with the shoulder it is necessary to push the latch lever inwardly upon the tire for allowing the loop to swing from the shoulder.

What I claim is:

1. A device of the class described comprising a plurality of arms, a latch lever pivotally mounted upon said arms, and engaging means carried by said latch lever, said latch lever releasably holding said means in a set position.

2. A device of the class described comprising a plurality of arms, a latch lever pivotally mounted upon said arms, and a latch pivotally mounted upon said latch lever, said latch lever being adapted to hold said latch in a set position.

3. A device of the class described comprising a plurality of arms, a latch lever pivotally mounted upon said arms, a latch pivotally mounted upon said latch lever, said latch lever being adapted to hold said latch in a set position, and means for releasably holding said latch lever in a set position.

4. A device of the class described, comprising a plurality of arms, a latch lever pivotally mounted upon said arms, a latch pivotally mounted upon said lever, said lever being adapted to hold said arm in a set position, and a loop engaging said latch lever for releasably holding said latch lever in a set position.

5. A device of the class described comprising a plurality of arms, said arms being curved through their entire length, one end of each arm terminating in a coiled eye, said eyes extending adjacent each other, a bolt carried by said eyes, a latch lever pivotally mounted upon said bolt, a latch pivotally mounted upon said latch lever, said latch lever being adapted to move said arms and latch to a set position, and means for releasably holding said latch lever in a set position.

6. A device of the class described comprising a plurality of arms, a latch lever pivotally mounted upon said arms, a latch pivotally mounted upon said latch lever, said latch being formed from a single strip of metal bent intermediate its ends and fitting upon itself for a considerable distance, said latch having a hook catch at one end, the ends of the strip from which said latch is formed being spread apart so as to embrace the side portions of said latch lever, means for holding said latch upon said latch lever, said latch lever being adapted to move upon said arms for swinging said latch to an adjusted position, and means for holding said latch lever in an adjusted position.

7. A device of the class described comprising an arm, a latch lever pivotally mounted upon said arm, said latch lever being formed of a single strip of metal bent intermediate its ends so as to fit upon itself throughout its entire length, one end of said strip being bent around the other end thereof, whereby said latch lever will be held in a folded condition, the end which is bent around constituting a shoulder, a latch pivotally mounted upon said latch lever, said latch lever being adapted to hold said latch in a set position, and a lever loop releasably engaging said shoulder for holding said latch lever in a set position.

8. A device of the class described comprising an arm, a latch lever pivotally mounted upon said arm, said latch lever being formed of a single strip of metal bent intermediate its ends so as to fit upon itself throughout its entire length, one end of said strip being bent around the other end thereof, whereby said latch lever will be held in a folded condition, the end which is bent around constituting a shoulder, a latch pivotally mounted upon said latch lever, said latch lever being adapted to hold said latch in a set position, and means engaging said shoulder for holding said latch lever in a set position.

In testimony whereof I hereunto affix my signature.

ELIJAH R. PARKER.

Copies of this patent may be obtained for five cents each, by addressing the "Commissioner of Patents, Washington, D. C."